United States Patent
Kaido et al.

(10) Patent No.: US 9,220,019 B2
(45) Date of Patent: Dec. 22, 2015

(54) COMMUNICATION SYSTEM, COMMUNICATION METHOD, PROGRAM AND INFORMATION STORAGE MEDIUM

(75) Inventors: Kenji Kaido, Kanagawa (JP); Eiichi Nishina, Tokyo (JP); Shohei Konno, Tokyo (JP); Tomohiro Hasekura, Tokyo (JP); Takamasa Shichisawa, Shizuoka (JP); Keigo Tsuchiya, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 152 days.

(21) Appl. No.: 13/807,800

(22) PCT Filed: Jun. 29, 2011

(86) PCT No.: PCT/JP2011/064898
§ 371 (c)(1),
(2), (4) Date: Feb. 25, 2013

(87) PCT Pub. No.: WO2012/002425
PCT Pub. Date: Jan. 5, 2012

(65) Prior Publication Data
US 2013/0157698 A1      Jun. 20, 2013

(30) Foreign Application Priority Data
Jul. 2, 2010   (JP) .................................. 2010-152531

(51) Int. Cl.
*H04W 24/00*         (2009.01)
*H04N 21/45*         (2011.01)
(Continued)

(52) U.S. Cl.
CPC ........... *H04W 24/00* (2013.01); *H04N 21/4524* (2013.01); *H04N 21/4788* (2013.01);
(Continued)

(58) Field of Classification Search
CPC ... H04N 21/41407; H04W 4/08; H04W 4/02; H04W 24/00
USPC ........................................ 455/457, 518, 519
See application file for complete search history.

(56) References Cited

U.S. PATENT DOCUMENTS 6,618,593 B1 * 9/2003 Drutman et al. ............ 455/456.3
7,593,740 B2 * 9/2009 Crowley et al. ............ 455/456.3
(Continued)

FOREIGN PATENT DOCUMENTS

| CN | 1767663 A | 5/2006 |
|---|---|---|
| CN | 101277240 A | 10/2008 |

(Continued)

OTHER PUBLICATIONS

International Preliminary Report on Patentability and Written Opinion for corresponding PCT Application No. PCT/JP2011/064898, dated Feb. 21, 2013.

(Continued)

*Primary Examiner* — William Nealon
(74) *Attorney, Agent, or Firm* — Matthew B. Dernier, Esq.

(57) ABSTRACT

Provided is a communication system for allowing a user to feel the presence of other users existing in the same daily living area without using short-distance wireless communication. The system includes a position coordinate receiving section (80) for obtaining positions from a plurality of user terminals, and a nearby user distributing section (94) for selecting, under the condition that the nearby user distributing section (94) obtains a position of a specified user terminal, one or more of the plurality of user terminals corresponding to the position obtained from the specified user terminal and the positions obtained from the plurality of user terminals and providing the specified user terminal with information on the selected one or more of the plurality of user terminals.

10 Claims, 10 Drawing Sheets

(51) Int. Cl.
   *H04N 21/4788*   (2011.01)
   *H04N 21/63*     (2011.01)
   *H04W 4/02*      (2009.01)
   *H04W 4/18*      (2009.01)
   *H04N 21/414*    (2011.01)

(52) U.S. Cl.
   CPC .............. *H04N21/632* (2013.01); *H04W 4/02* (2013.01); *H04W 4/023* (2013.01); *H04W 4/18* (2013.01); *H04N 21/41407* (2013.01)

(56) References Cited

U.S. PATENT DOCUMENTS

| | | | |
|---|---|---|---|
| 7,945,272 | B2 | 5/2011 | Kim |
| 8,099,100 | B2 | 1/2012 | Yamada |
| 8,676,225 | B2 | 3/2014 | Rekimoto |
| 8,825,363 | B2 | 9/2014 | Takanashi |
| 2003/0013456 | A1* | 1/2003 | Bates et al. ............... 455/456 |
| 2006/0063548 | A1 | 3/2006 | Kim |
| 2007/0287473 | A1* | 12/2007 | Dupray ............... 455/456.1 |
| 2008/0070593 | A1* | 3/2008 | Altman et al. ............ 455/457 |
| 2008/0182586 | A1* | 7/2008 | Aaron ............... 455/456.1 |
| 2008/0242278 | A1 | 10/2008 | Rekimoto |
| 2009/0271111 | A1 | 10/2009 | Takanashi |
| 2010/0240381 | A1 | 9/2010 | Yamada |

FOREIGN PATENT DOCUMENTS

| | | |
|---|---|---|
| JP | 2003153322 A | 5/2003 |
| JP | 2004312694 A | 11/2004 |
| JP | 2005167542 A | 6/2005 |
| JP | 2006004318 A | 1/2006 |
| JP | 2006025253 A | 1/2006 |
| JP | 2006081184 A | 3/2006 |
| JP | 2008092347 A | 4/2008 |
| JP | 2009213140 A | 9/2009 |
| JP | 2009288233 A | 12/2009 |
| JP | 2010028806 A | 2/2010 |
| JP | 2010130598 A | 6/2010 |
| JP | 2010141578 A | 6/2010 |

OTHER PUBLICATIONS

International Search Report for corresponding PCT Application No. PCT/JP2011/064898, dated Aug. 16, 2011.
Office Action for corresponding CN Application No. 2011800423068, dated Sep. 3, 2014.
Office Action for corresponding JP Application No. 2014-228378 dated Sep. 8, 2015.

* cited by examiner

FIG.10

| POSITION COORDINATE | DATE/TIME |
|---|---|
| $(X_{01}, Y_{01})$ | 6/30/2010  12:00 |
| $(X_{02}, Y_{02})$ | 6/30/2010  12:30 |
| $(X_{03}, Y_{03})$ | 6/30/2010  13:00 |
| $(X_{04}, Y_{04})$ | 6/30/2010  14:00 |
| $(X_{05}, Y_{05})$ | 6/30/2010  14:30 |

FIG.11

| TITLE ID | LEVEL | PLAY TIME | LAST PLAY DATE/TIME |
|---|---|---|---|
| T001 | 1 | 18h | 6/25/2010  13:15 |
| T003 | 4 | 110h | 6/25/2010  15:45 |
| T024 | 2 | 52h | 7/1/2010  9:23 |
| T013 | 3 | 61h | 7/2/2010  19:34 |
| T002 | 1 | 3h | 6/23/2010  13:08 |

FIG.13

| AREA ID | TIME SLOT | GAME PERFORMANCE DATA 1 | | | GAME PERFORMANCE DATA 2 | | |
|---|---|---|---|---|---|---|---|
| | | TITLE ID | LEVEL | PLAY TIME | TITLE ID | LEVEL | PLAY TIME |
| 010010···· | 6/10/2010 12:00~18:00 | T001 | 3 | 102h | T011 | 2 | 80h |
| 010010···· | 6/10/2010 18:00~24:00 | T002 | 2 | 84h | T007 | 4 | 135h |

FIG.14

AREA ID : 010010····

| USER ID | POSITION COORDINATE | DATE/TIME |
|---------|---------------------|-----------|
| U001 | $(X_1, Y_1)$ | 6/8/2010  13:24 |
| U013 | $(X_2, Y_2)$ | 6/8/2010  13:25 |

FIG.15

| USER ID | LATEST POSITION COORDI-NATE SET | DATE/TIME | GAME PERFORMANCE DATA 1 | | | GAME PERFORMANCE DATA 2 | | |
|---|---|---|---|---|---|---|---|---|
| | | | TITLE ID | LEVEL | PLAY TIME | TITLE ID | LEVEL | PLAY TIME |
| U001 | $(X_n, Y_n)$ | 6/12/2010 12:10 | T001 | 1 | 18h | T003 | 4 | 110h |
| U002 | $(X_m, Y_m)$ | 6/12/2010 12:00 | T100 | 1 | 25h | T008 | 2 | 54h |

COMMUNICATION SYSTEM, COMMUNICATION METHOD, PROGRAM AND INFORMATION STORAGE MEDIUM

TECHNICAL FIELD

The present invention relates to a communication system, a communication method, a program and an information storage medium.

BACKGROUND ART

Conventional game systems, in which game terminals within a relatively short distance from each other communicate wirelessly to directly exchange game data, are known. With such game systems, it could happen that users of the game terminals incidentally exchange game data while passing each other, and thus strangers are allowed to exchange game data with less stress. In addition, the users can feel other users existing in the same daily living area.

SUMMARY OF INVENTION

Technical Problem

The present invention departs from this conventional system, providing a communication system, a communication method, a program and an information storage medium for allowing users to feel other users existing in the same living area without using short-distance wireless communication.

Solution to Problem

In order to solve the above-mentioned problem, according to the present invention, there is provided a communication system including a position obtaining unit that obtains positions from a plurality of user terminals, a user terminal selecting unit that selects, under the condition that the user terminal selecting unit obtains a position of a specified user terminal, one or more of the plurality of user terminals corresponding to the position obtained from the specified user terminal and the positions obtained from the plurality of user terminals, and an information providing unit that provides the specified user terminal with information on the selected one or more of the plurality of user terminals.

According to the present invention, there is provided a communication method including obtaining positions from a plurality of user terminals, selecting, under the condition that a position of a specified user terminal is obtained, one or more of the plurality of user terminals corresponding to the position obtained from the specified user terminal and the positions obtained from the plurality of user terminals, and providing the specified user terminal with information on the selected one or more of the plurality of user terminals.

According to the present invention, there is provided a program for causing a computer to execute obtaining positions from a plurality of user terminals, selecting, under the condition that a position of a specified user terminal is obtained, one or more of the plurality of user terminals corresponding to the position obtained from the specified user terminal and the positions obtained from the plurality of user terminals, and providing the specified user terminal with information on the selected one or more of the plurality of user terminals.

According to the present invention, there is provided an information storage medium for storing a program for causing a computer to execute obtaining positions from a plurality of user terminals, selecting, under the condition that a position of a specified user terminal is obtained, one or more of the plurality of user terminals corresponding to the position obtained from the specified user terminal and the positions obtained from the plurality of user terminals; and providing the specified user terminal with information on the selected one or more of the plurality of user terminals.

BRIEF DESCRIPTION OF DRAWINGS

In the accompanying drawings:

FIG. 10 is a diagram schematically illustrating data in a position coordinate storage section;

FIG. 11 is a diagram schematically illustrating data in a game performance data storage section;

FIG. 13 is a diagram schematically illustrating data in an area-based title ID storage section;

FIG. 14 is a diagram schematically illustrating data in an area-based user ID storage section; and FIG. 15 is a diagram schematically illustrating data in a user information storage section.

DESCRIPTION OF EMBODIMENTS

An embodiment of the present invention is described in detail below with reference to the drawings.

Figure 1:
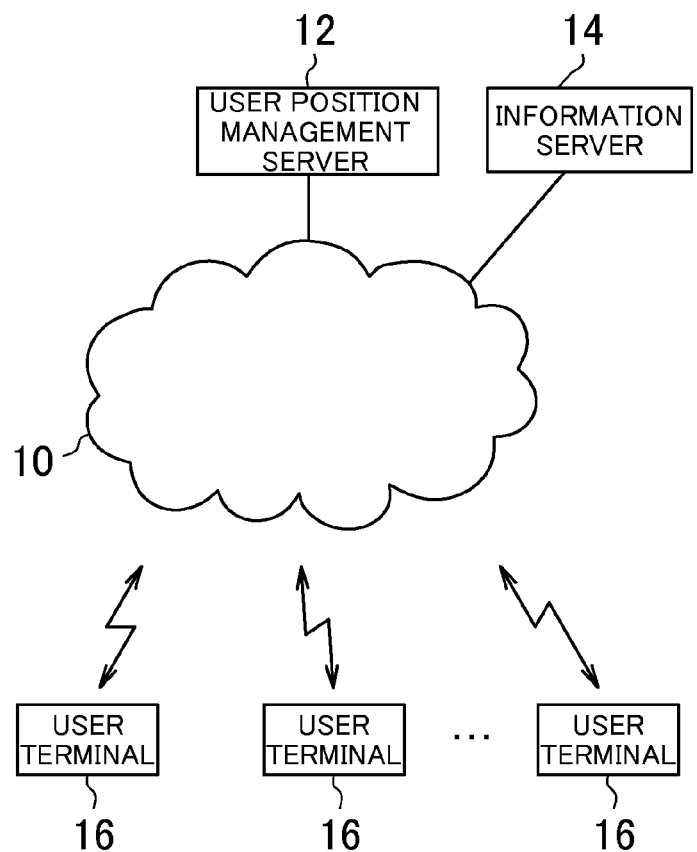
FIG. 1 is an overall configuration diagram of a communication system according to an embodiment of the present invention.
Figure 2:
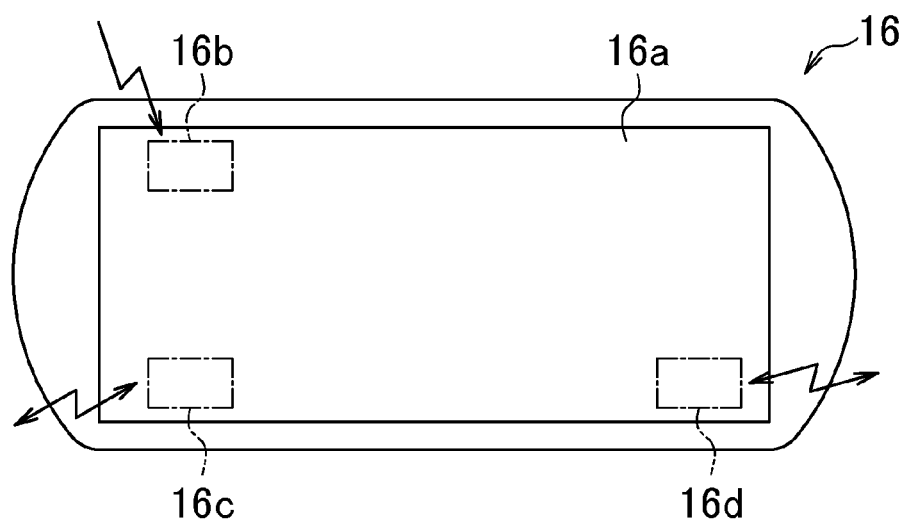
FIG. 2 is a diagram illustrating the external appearance of a user terminal.

FIG. 1 is an overall configuration diagram of a communication system according to the embodiment of this invention. As illustrated in FIG. 1, the communication system includes a user position management server 12, an information server 14, and a plurality of user terminals (information processing devices) 16 which are connected to a computer communication network 10 such as the Internet. The user position management server 12 and the information server 14 are constituted mainly of known server computers, for example. Each user terminal 16 is a portable computer game system driven on a battery, and has a touch screen 16a on the front as illustrated in an exterior view of FIG. 2. The user terminal 16 also has, as built-in components, a positioning unit 16b, which uses Global Positioning System (GPS) to calculate the position (the latitude and longitude) of the user terminal 16, a cellular phone communication unit 16c, which communicates data over a cellular phone network, and a wireless LAN communication unit 16d, which communicates data over a wireless LAN. The user terminal 16 selectively uses one of the cellular phone communication unit 16c and the wireless LAN communication unit 16d that is suitable for the communication environment to connect to the computer communication network 10, and communicates data with the user position management information server 12 and the information server 14.

Figure 3:
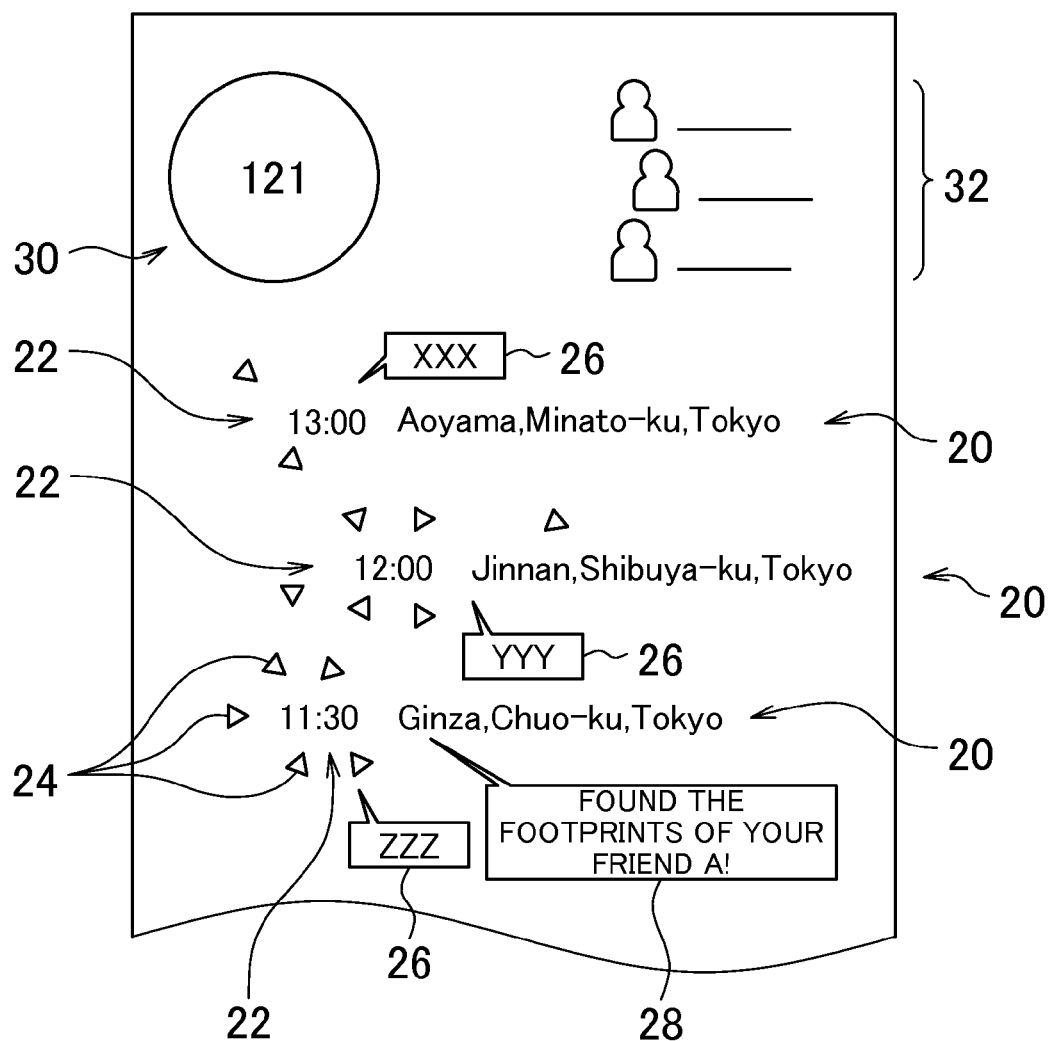
FIG. 3 is a diagram illustrating an example of a travel route image.

The user terminal 16 repeatedly calculates its own position with the use of satellite signals and holds the results of the positioning. The user terminal 16 also holds data that indicates game program execution performance. The positioning results and the game execution performance data are uploaded to the user position management server 12 manually when the user operates the user terminal 16 to do so, or automatically at regular time intervals. The user position management server 12 holds positioning results and execution performance data that are uploaded from many user terminals 16 in this manner. Each user terminal 16 displays on the touch screen 16a a travel route image of the user terminal 16 as shown in FIG. 3 based on the information held on the user position management server 12 and the positioning results held by itself. The travel route image has a shape that is longer in height than in width, and only a part of the travel route image which is set to a display range is displayed on the touch screen 16a. The user can move the display range by making a given operation on the touch screen 16a.

As shown in FIG. 3, the lower area of the travel route image includes images of the travel route of the user terminal 16. As described above, the user terminal 16 repeatedly calculates its own position and holds the calculated positions. The lower area of the travel route image displays address letter strings 20 each indicating a held position and a calculating date/time 22, in the order that the positions have been calculated. Specifically, newer calculation results are displayed at the top. At this time, although the positioning unit 16b repeatedly calculates the position of its own user terminal 16, the user terminal 16 keeps a record of a newly calculated position only when the newly calculated position is at a given distance (for example, 2 km) or more from the latest position that has been held in the user terminal 16. The user terminal 16 does not keep a record of a newly calculated position when the distance between the newly calculated position and the latest held position is shorter than the given distance. As such, the travel route image does not display two address letter strings 20 in the up-down direction, if the position of one of the address letter strings 20 is less than the given distance from the position of the other address letter string. This way, the travel route image displays only significant travels and therefore is easy to comprehend. In addition, because displaying insignificant information is prevented, the touch screen 16a can be used efficiently.

A plurality of small images 24 are displayed around each calculating date/time 22 in the lower area of the travel route image. More small images 24 are displayed the greater the number of other user terminals 16 that have uploaded the same position to the user position management server 12. This enables the user to grasp at a glance whether or not many of other users carrying the user terminals 16 have been at each position. A title 26 of a featured game program is also displayed in each calculating date/time 22.

On the lower area of the travel route image, when a user terminal 16 of another friend user has calculated and uploaded to the user position management server 12 the same position as the position calculated and uploaded to the user position management server 12 by the user terminal 16, the user terminal 16 displays a message 28 such as "found the footprints of your friend A!" to indicate that the friend has been at the same position.

On an upper left area 30 of the travel route image, the user terminal 16 displays a total number of the users who have calculated and uploaded to the user position management server 12 the same positions as calculated and uploaded to the user position management server 12 by the user terminal 16. In addition, on an upper right area 32, there is displayed information relating to other users who are friends of the user.

Figure 4:
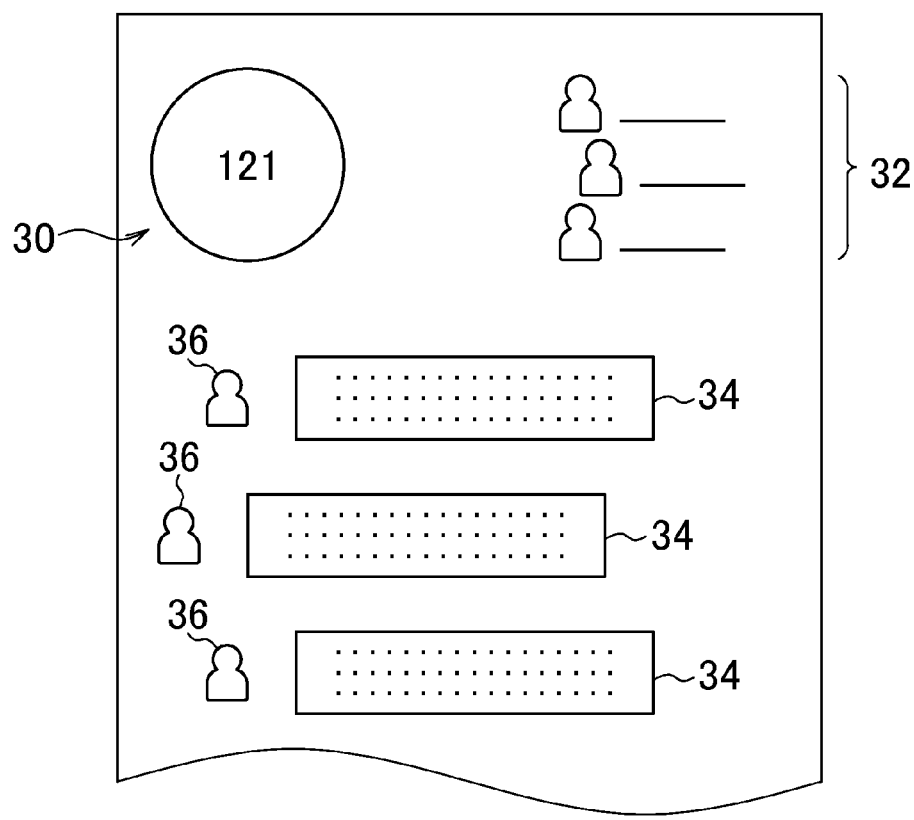
FIG. 4 is a diagram illustrating an example of a friend image.

FIG. 4 illustrates a friend image which is displayed on the touch screen 16a when the upper right area 32 is tapped by the user in the travel route image of FIG. 3. As shown in FIG. 4, an avatar image 36 of each friend and an item of latest information 34 about the friend are displayed on the lower area of the friend image. The latest information 34 is received from, for example, an information server 14. The friend image also has a shape that is longer in height than in width, and only a part of the friend image which is set to a display range is displayed on the touch screen 16a. The user can move the display range by making a given operation on the touch screen 16a.

Figure 5:
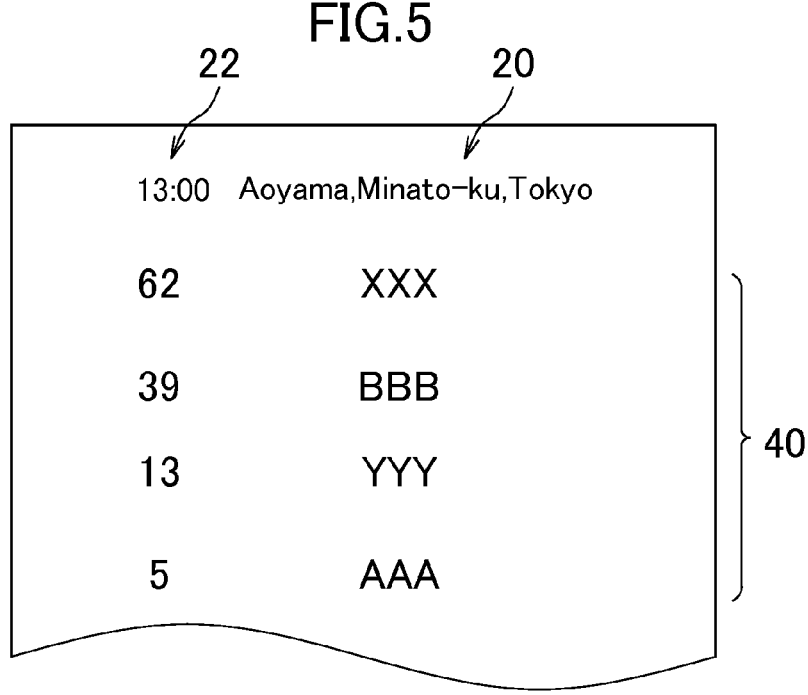
FIG. 5 is a diagram illustrating an example of a ranking image.

FIG. 5 illustrates a ranking image which is displayed on the touch screen 16a when the user taps the address letter string 20 in the travel route image of FIG. 3. As illustrated in FIG. 5, an upper area of the ranking image displays an address letter string 20 tapped by the user and a calculating date/time 22 of the position indicated by the tapped address letter string 20. A lower area of the ranking image displays the titles of game programs that have been played on the user terminals 16 from which the position indicated by the address letter string 20 have been uploaded to the user position management server 12. The game titles are displayed in descending order of the number of the user terminals 16 on which the game programs having those titles have been played. Displayed to the left of each title is the number of user terminals 16 on which the game program having the title has been played. The ranking image, too, has a shape that is longer in height than in width, and only a part of the ranking image which is set to a display range is displayed on the touch screen 16a. The user can move the display range by making a given operation on the touch screen 16a.

Figure 6:
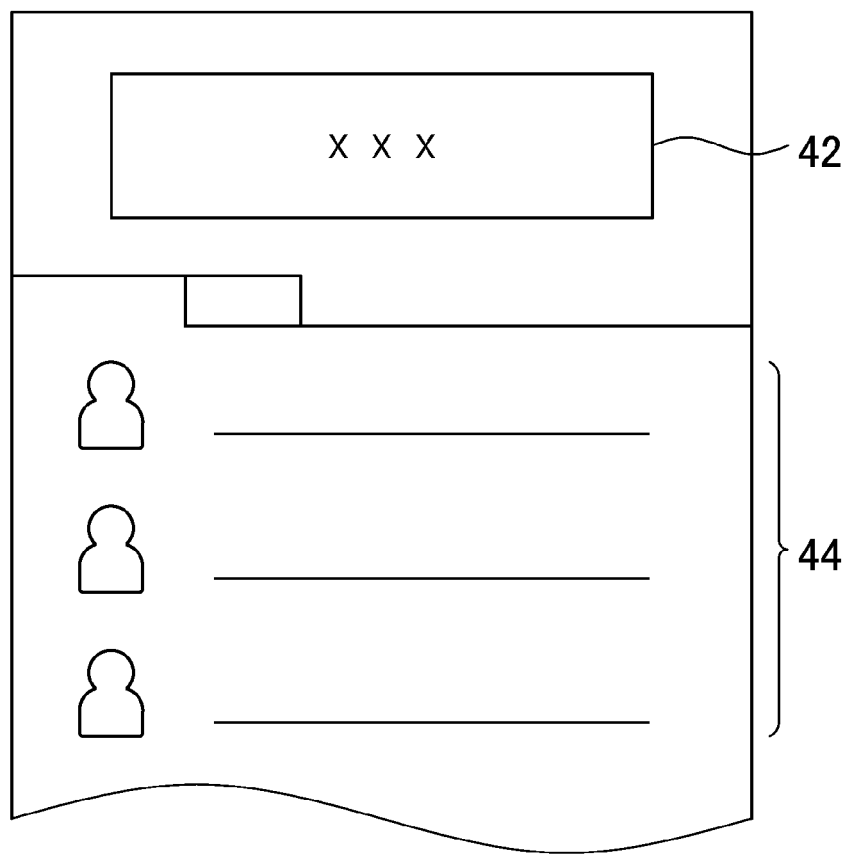
FIG. 6 is a diagram illustrating an example of a title profile image.

FIG. 6 illustrates a title profile image which is displayed on the touch screen 16a when one of game programs is tapped in the ranking image of FIG. 5 or one of the titles 26 is tapped in the travel route image of FIG. 3. An upper area of the title profile image contains a title image 42 of the game program. A lower area of the title profile image contains an information field 44 which shows evaluations given by other users on the game program and other users' play status of the game program. The title image 42 or information on the information field 44 is also received from, for example, the information server 14. The title profile image, too, has a shape that is longer in height than in width, and only a part of the ranking image which is set to a display range is displayed on the touch screen 16a. The user can move the display range by making a given operation on the touch screen 16a.

Figure 7:
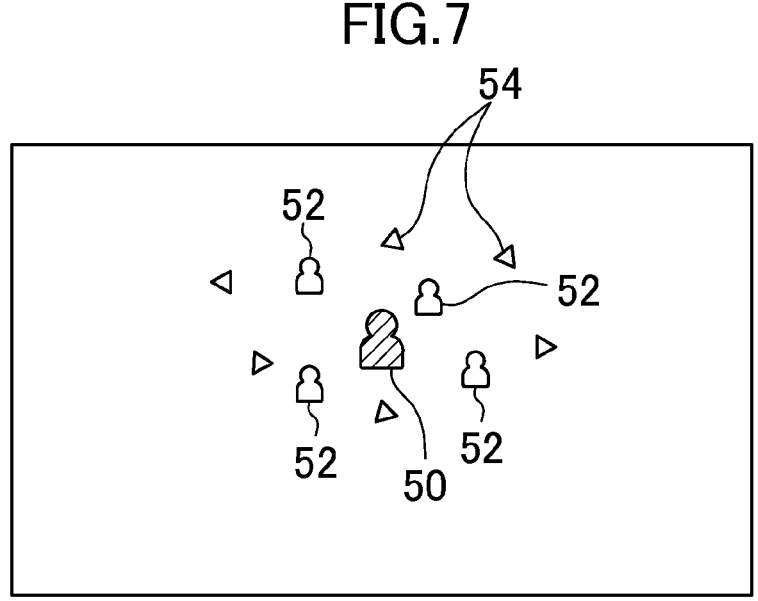
FIG. 7 is a diagram illustrating an example of a radar image.

FIG. 7 illustrates a radar image which is displayed on the touch screen 16a when the address letter string 20 is tapped in the ranking image of FIG. 5. A avatar image 50 which represents the user in question is displayed at the center of the radar image, and avatar images 52 of other users whose privacy settings are set to "public" are displayed around the avatar image 50. The radar image also displays small images 54, which suggest the presence of other users whose privacy settings are set to "private", around the avatar image 50. The display position of each of the avatar images 50 and the avatar images 52 on the touch screen 16a is determined based on a position actually calculated by the positioning unit 16b. In other words, based on a position calculated by the positioning unit 16b and uploaded to the user position management server 12, the user terminal 16 calculates the positions of other "public" users relative to its own position and, based on the calculated relative positions, determines the display positions of the avatar images 52 on the touch screen 16a. The display positions of the small images 54 on the touch screen 16a, on the other hand, are determined by random numbers.

Figure 8:
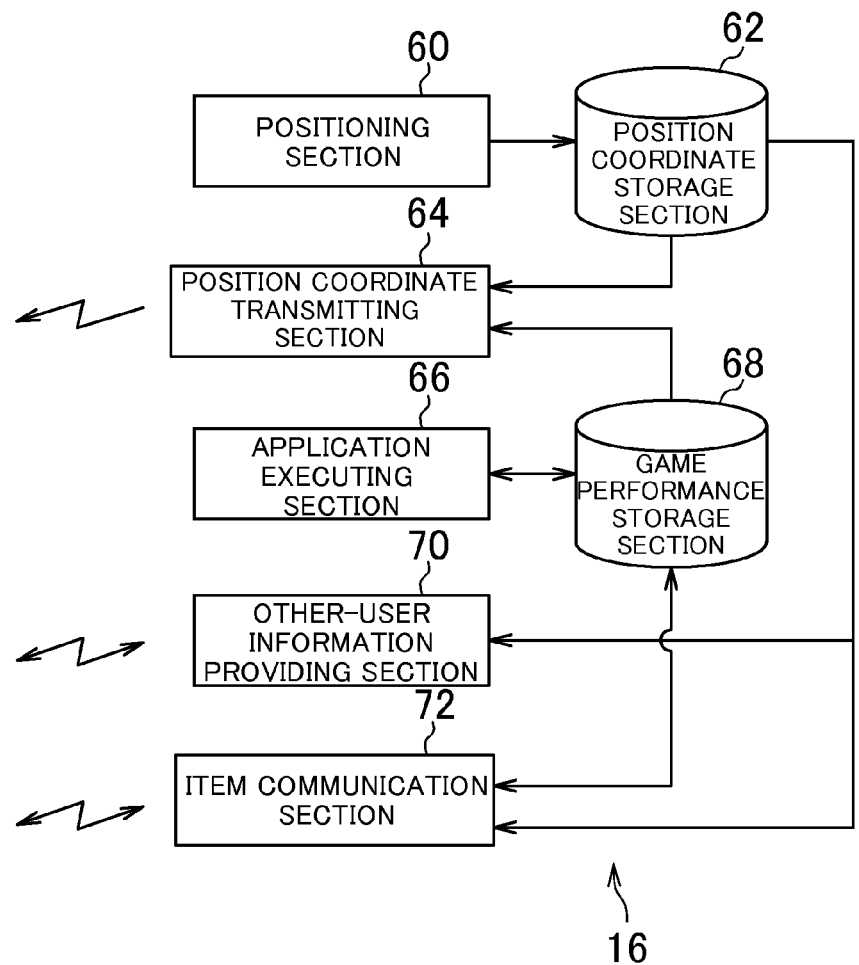
FIG. 8 is a function block diagram of the user terminal.
Figure 9:
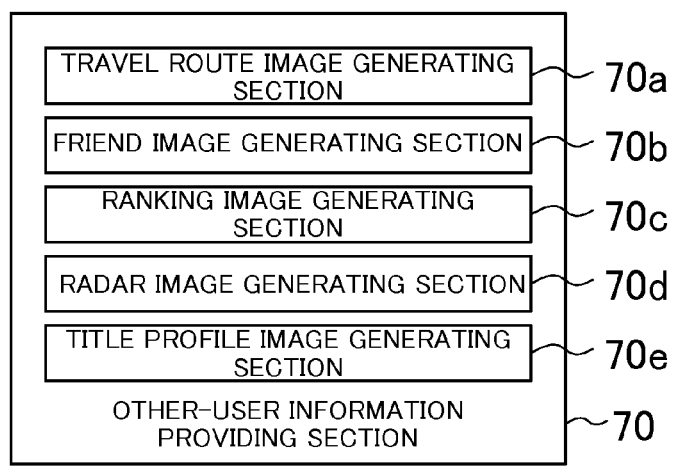
FIG. 9 is a diagram illustrating a configuration of an other-user information providing section.

The configuration of the communication system described above is described in more detail. FIGS. 8 and 9 are function block diagrams of each user terminal 16. As illustrated in FIG. 8, the user terminal 16 includes as functional components a positioning section 60, a position coordinate storage section 62, a position coordinate transmitting section 64, an application executing section 66, a game performance storage section 68, an other-user information providing section 70, and an item communication section 72. The other-user information providing section 70 includes, as illustrated in FIG. 9, a travel route image generating section 70a, a friend image generating section 70b, a ranking image generating section 70c, a radar image generating section 70d, a title profile image generating section 70e. These function components are implemented by executing a program according to the embodiment of the present invention on the user terminal 16, which is a computer game system. This program may be downloaded from another computer via the computer communication network 10, or may be stored in a computer-readable information storage medium such as a CD-ROM or a DVD-ROM to be installed in the user terminal 16. In the latter case, the user terminal 16 has a built-in or external medium reading device for reading the program out of the medium.

The positioning section 60 is constituted mainly of the positioning unit 16b. The positioning section 60 periodically (for example, every thirty minutes) activates the positioning unit 16b to receive satellite signals (GPS signals) and generate position coordinates (latitude and longitude) from the received signals. The positioning section 60 may activate the positioning unit 16b to receive satellite signals and generate position coordinates from the received signals also when the user gives via the touch screen 16a an explicit instruction to perform positioning. Alternatively, the positioning section 60 may obtain the position coordinates of the user terminal 16 based on identification information and other types of necessary information of a wireless access point with which the wireless LAN communication unit 16d can communicate. For instance, a not-shown server stores in advance identification information of a wireless access point in association with position coordinates, and the positioning section 60 transmits identification information to the server to obtain position coordinates that are associated with the identification information. The positioning section 60 may transmit, to the server, identification information of a plurality of wireless access points and the intensity of radio waves from each wireless access point. The server in this case performs weighting based on the radio wave intensity, combines the position coordinates of the wireless access points to calculate the position coordinate of the user terminal 16, and returns the calculated coordinates to the positioning section 60. Similarly, the position coordinates of the user terminal 16 may be obtained based on identification information and other types of necessary information of a cellular phone base station with which the cellular phone communication unit 16c can communicate. Instead of the positioning section 60 obtaining the position coordinates of the user terminal 16 and transmitting the obtained coordinates to the user position management server 12, the user position management server 12 may obtain position coordinates indicated by identification information and other types of necessary information of a wireless access point or a cellular phone base station that are transmitted from the positioning section 60.

As illustrated in FIG. 10, the position coordinate storage section 62 stores a given number of (for example, ten) position coordinate sets and calculating dates/times of the position coordinates in association with each other. The positioning section 60 reads position coordinates stored last in the position coordinate storage section 62 each time new position coordinates are generated, and calculates the distance between the newly generated position coordinates and the read position coordinates. When the calculated distance is equal to or more than a given distance (for example, 2 km), the position coordinate storage section 62 stores the newly generated position coordinates along with the calculating date/time of the position coordinates. At this point, position coordinates that have been stored longer than a given number of days (seven days, for example) are deleted along with the calculating date/time of the expired position coordinates. If the position coordinate storage section 62 is storing the given number of position coordinate sets in association with their calculating dates/times and none of the position coordinate sets have been stored longer than the given number of days, the oldest position coordinates and their calculating date/time are deleted in order to store newly generated position coordinates and their calculating date/time instead. When the distance between the newly generated position coordinates and the read position coordinates is less than the given distance, on the other hand, the new position coordinates are discarded instead of being stored in the position coordinate storage section 62.

The application executing section 66 executes an application program such as a game program. The application program may be downloaded from another computer via the computer communication network 10 or may be stored in a computer-readable information storage medium such as a CD-ROM or a DVD-ROM to be installed in the user terminal 16.

As illustrated in FIG. 11, the game performance storage section 68 stores a title ID, a viewing level, a total play time, and a last play date/time in association with each other for each of a given number of (for example, five) game programs that have been executed lately by the application executing section 66. The title ID is information for identifying each game program. The total play time indicates the total length of time the game program identified by the title ID has been played. The viewing level is information indicating how enthusiastic the user is about the game program which is calculated from e.g., the total play time. The last play date/time indicates the date/time (activation date/time or shutdown date/time) when the game program has been played the last time.

The position coordinate transmitting section 64 uses the cellular phone communication unit 16c or the wireless LAN communication unit 16d to transmit, to the user position management server 12, the plurality of position coordinate sets and their calculating dates/times stored in the position coordinate storage section 62, and the title IDs, viewing levels, and total play times of the given number of game programs stored in the game performance storage section 68. This transmission may be executed when the user gives through the touch screen 16a an explicit instruction to transmit. At this time, it is preferred if the position coordinate transmitting section 64 displays a plurality of position coordinate sets and their calculating dates/times stored in the position coordinate storage section 62 on the touch screen 16a to check whether or not the user wishes to transmit the displayed position coordinate sets and calculating dates/times. The position coordinate transmitting section 64 may be further capable of removing position coordinate sets and their calculating dates/times that the user does not wish to transmit and transmitting only the rest to the user position management server 12. The user may set the user terminal 16 to omit this checking. In this case, a plurality of position coordinate sets and their calculating dates/times stored in the position coordinate storage section 62 are transmitted automatically and periodically (for example, once a day). The other-user information providing section 70 and the item communication section 72 are described later.

Figure 12:
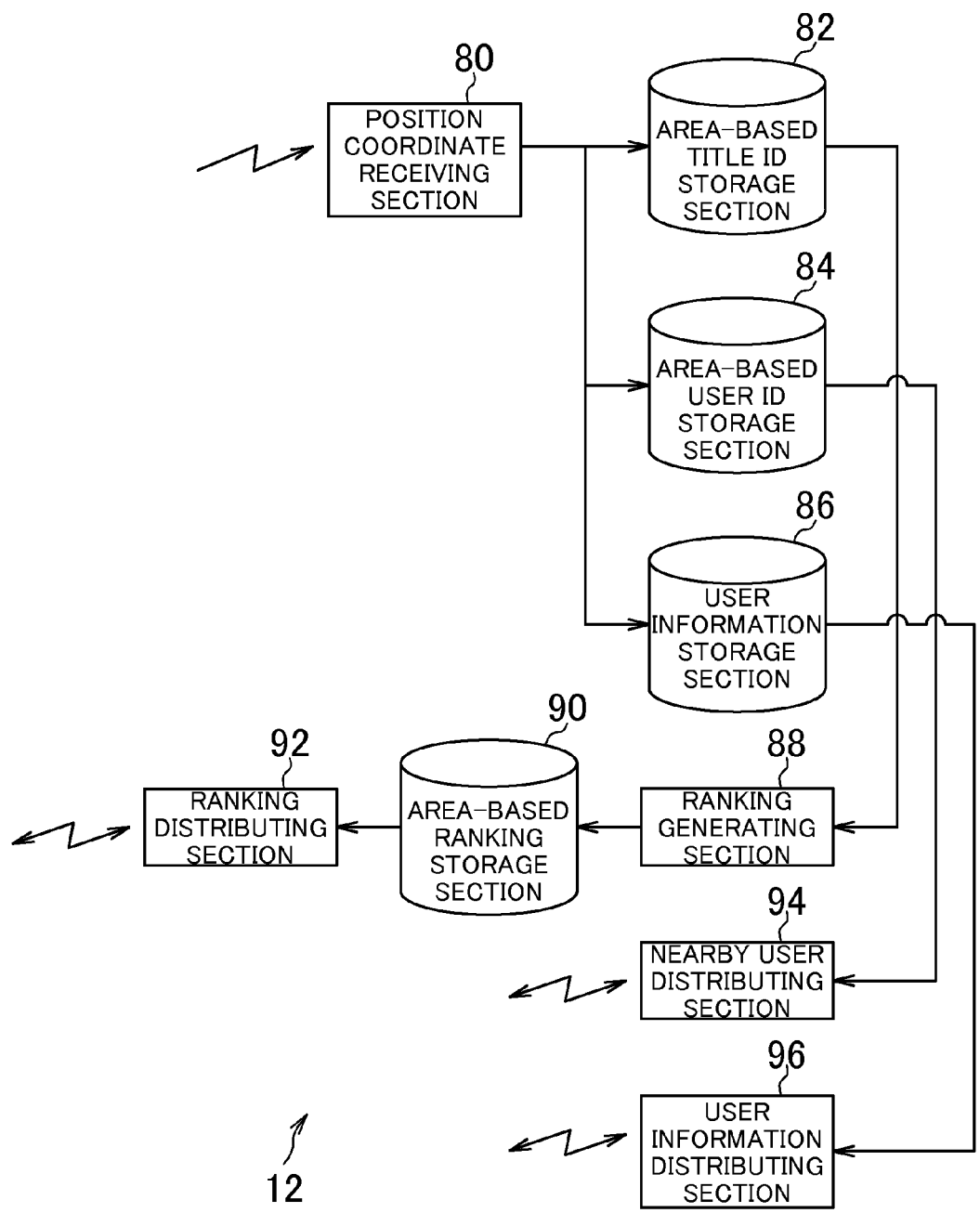
FIG. 12 is a function block diagram of a user position management server.

FIG. 12 is a function block diagram of the user position management server 12. As illustrated in FIG. 21, the user position management server 12 includes as functional components a position coordinate receiving section 80, an area-based title ID storage section 82, an area-based user ID storage section 84, a user information storage section 86, a ranking generating section 88, an area-based ranking storage section 90, a ranking distributing section 92, a nearby user distributing section 94, and a user information distributing section 96. These function components are implemented by executing the program according to the embodiment of the present invention on the user position management server 12, which is a computer. This program may be downloaded from another computer via the computer communication network 10, or may be stored in a computer-readable information storage medium such as a CD-ROM or a DVD-ROM to be installed in the user position management server 12.

The position coordinate receiving section 80 receives a plurality of position coordinate sets and their calculating dates/times and game performance data (title IDs, viewing levels, and total play times) of the given number of game programs which are transmitted from the position coordinate transmitting section 64 of each user terminal 16.

As illustrated in FIG. 13, the area-based title ID storage section 82 stores an area ID, a time slot, and a given number of (for example, twenty) game performance data pieces in association with one another. The area ID is information for identifying (specifying) each mesh cell area created by dividing a management subject area (for example, the entire area covering the Earth) into a plurality of mesh cells. The time slot is information for identifying a time range having a given length of time (for example, six hours). Each game performance data piece contains a title ID, a viewing level, and a total play time. In other words, the area-based title ID storage section 82 stores a given number of (for example, twenty) game performance data pieces in association with an area ID and a time slot. When receiving a plurality of position coordinate sets and their calculating dates/times and a given number of game performance data pieces from one user terminal 16, the position coordinate receiving section 80 derives for each received position coordinate set the area ID of an area that contains the position coordinate set. The position coordinate receiving section 80 also derives a time slot that contains the calculating date/time of the received position coordinate set. The position coordinate receiving section 80 stores the game performance data received from the user terminal 16 in the area-based title ID storage section 82 in association with the derived area ID and the derived time slot. If the given number of game performance data pieces are already stored in a relevant part of the area-based title ID storage section 82 at this point, the oldest game performance data is deleted and the game performance data received this time is stored instead.

As illustrated in FIG. 14, the area-based user ID storage section 84 stores for each area ID a user ID, a position coordinate set, and a calculating date/time in association with one another. When receiving a plurality of position coordinate sets and their calculating dates/times, and the title IDs, viewing levels, and total play times of a given number of game programs from one user terminal 16, the position coordinate receiving section 80 derives for each received position coordinate set the area ID of an area that contains the position coordinate set. The user ID of the user who is using the user terminal 16 and the received position coordinate set and calculating date/time are stored in the area-based user ID storage section 84 in association with the derived area ID. A position coordinate set and its calculating date/time that has been stored longer than a given length of time (for example, one week) is deleted from the area-based user ID storage section 84.

As illustrated in FIG. 15, the user information storage section 86 stores a user ID, a latest position coordinate set, a calculating date/time, and a given number of (for example, twenty) game performance data pieces in association with one another. When receiving a plurality of position coordinate sets and their calculating dates/times, and a given number of game performance data pieces of one user terminal 16, the position coordinate receiving section 80 stores the position coordinate set obtained last and its calculating date/times and the received given number of game performance data pieces in the user information storage section 86 in association of the user ID of the user who is using the user terminal 16.

The ranking generating section 88 generates the ranking of game titles for each area ID based on data stored in the area-based title ID storage section 82. For instance, the number of game performance data pieces that are stored on an area ID basis in the area-based title ID storage section 82 in association with time slots within a given period of time (for example, past one month) are aggregated for each title ID, and top ten titles are used to generate ranking. Data of this ranking includes the total game performance data count (gross player count) of each title ID. Alternatively, viewing levels of game performance data that are stored on an area ID basis in the area-based title ID storage section 82 in association with time slots within a given period of time (for example, past one month) are averaged for each title ID, and top ten of the average values are used to generate ranking. Data of this ranking, too, includes the total game performance data count (gross player number) of each title ID. Data of the generated ranking is stored in the area-based ranking storage section 90 in association with area IDs. The ranking distributing section 92 receives a set of position coordinates from one user terminal 16, derives the area ID of an area that contains the received position coordinate set, reads ranking that is stored in the area-based ranking storage section 90 in association with the derived area ID, and returns the read ranking to the user terminal 16.

The nearby user distributing section 94 receives a set of coordinates and the specification of a search area size from one user terminal 16, and sets as the search area a group of n×n (e.g., 1×1, 3×3, 5×5, 7×7, 9×9, . . . , 25×25) areas that include the area containing the received position coordinate set (for example, at the center point of the area). The variable n is determined by the specification of a search area size received from the user terminal 16. The nearby user distributing section 94 then reads every user ID and every position coordinate set that are stored in the area-based user ID storage section 84 in association with the area ID of each area constituting the determined search area and returns the read user ID and position coordinate set to the user terminal 16.

The user information distributing section 96 receives a user ID from one user terminal 16, and returns to the user terminal 16 the latest position coordinate set, its calculation data, and a given number of game performance data pieces that are stored in the user information storage section 86 in association with the received user ID. When the user of one user terminal 16 wishes to see on the touch screen 16a the title of a game that is being played by a specific user, the user receives this information from the user information distributing section 96.

Processing executed by each user terminal 16 to display various screens is described. The other-user information providing section 70 of the user terminal 16 includes, as described above, the travel route image generating section 70a, the friend image generating section 70b, the ranking image generating section 70c, the radar image generating section 70d, the title profile image generating section 70e.

The travel route image generating section 70a generates the travel route image of FIG. 3. To generate the travel route image, the travel route image generating section 70a first reads position coordinate sets and their calculating dates/times out of the position coordinate storage section 62. Subsequently, the travel route image generating section 70a obtains for each position coordinate set an address letter string 20 that corresponds to the position coordinate set. The address letter string 20 may be stored in the user terminal 16 in advance in association with a range of position coordinates, or may be stored in the information server 14 in the same manner. In the latter case, when a set of position coordinates is transmitted to the information server 14, the information server 14 reads an address letter string 20 associated with a range that contains the transmitted position coordinate set, and transmits the read address letter string to the user terminal 16. Address letter strings 20 obtained in this manner are included along with calculating dates/times 22 in the travel route image in the order of calculating date/times 22. Specifically, the calculating date/times 22 and the address letter strings 20 are placed side by side in a way that newer pairs of the calculating date/time 22 and the address letter string 20 are placed at the top.

Next, the travel route image generating section 70a transmits to the user position management server 12 each position coordinate set stored in the position coordinate storage section 62 to request to generate ranking. In response to the request, the ranking distributing section 92 of the user position management server 12 derives the area ID of an area that contains the received position coordinate set, reads ranking that is stored in the area-based ranking storage section 90 in association with the derived area ID, and returns the read ranking to the user terminal 16. In the case where ranking associated with the same area ID has already been received from the user position management server 12, the travel route image generating section 70a compares the already received ranking and the newly received ranking. A game title with a rank that has increased most and a game title that has increased most in values that are the basis of the ranking (the total game performance data count, an average value of viewing levels, and the like) are included in the travel route image as hot titles (Reference Symbol 26). In the case where ranking associated with the same area ID has not been received yet from the user position management server 12, a game title that has the highest rank in the currently received ranking is included in the travel route image as a hot title.

The travel route image generating section 70a transmits to the user position management server 12 each position coordinate set stored in the position coordinate storage section 62 and a size specification that specifies 1×1 area as the search area, thereby requesting the user position management server 12 to search for nearby users. In response to the request, the nearby user distributing section 94 of the user position management server 12 derives the area ID of an area that contains the received position coordinate set, reads every user ID and every position coordinate set that are stored in the area-based user ID storage section 84 in association with the derived area ID, and returns the read user ID and position coordinate set to the user terminal 16. The travel route image generating section 70a counts up the number of user IDs associated with each position coordinate set, and displays small images 24, the number of the small images 24 being according to the counted number of user IDs, in the neighborhood of the calculating date/time concerning the position coordinate set. Further, the travel route image generating section 70a adds up the number of user IDs associated with each position coordinate set, and displays the number in the upper left area 30.

The user terminal 16 stores the user IDs of friends of its own user. The user terminal 16 receives information associated with the stored user IDs from the information server 14, and includes the information in the upper right area 32. When the user ID of a friend stored in the user terminal 16 is included among user IDs transmitted from the nearby user distributing section 94 of the user position management server 12, the user terminal 16 displays a message 28 below the address letter string 20 related to the user ID. The travel route image generated in this manner is displayed on the touch screen 16a.

The friend image generating section 70b generates the friend image of FIG. 4. To generate the friend image, the friend image generating section 70b reads friend user IDs stored in the user terminal 16, and receives an avatar image 36 and latest information 34 associated with the read user IDs from the information server 14. The latest information 34 can be messages entered by friend users from their user terminals 16 or other computers, and messages automatically generated by game programs that are executed on the user terminals 16 or other computers to indicate the game program execution state (the progress of the game, the skill level of players, and the like). The latest information is included in lower areas of entries in the friend image to complete the friend image. The friend image generated in this manner is displayed by the touch screen 16a.

The ranking image generating section 70c generates the ranking image of FIG. 5. The ranking image generating section 70c transmits a position coordinate set specified by the user to the user position management server 12, and receives ranking data from the ranking distributing section 92. The ranking image is generated based on the thus received ranking data. The generated ranking image is displayed by the touch screen 16a. The ranking image generating section 70c may receive ranking data concerning a plurality of position coordinate sets (for example, all position coordinate sets) stored in the position coordinate storage section 62 to add up for each title the values that are the basis of ranking generation (the total game performance data count, an average value of viewing levels, and the like), generate ranking from the sum, and generate and display the ranking image. This way, the user terminal 16 can display comprehensive ranking at a plurality of positions that the user has visited.

The title profile image generating section 70e generates the title profile image of FIG. 6. The title profile image generating section 70e transmits a title ID to the information server 14 and receives the title image 42 and information to be written in the information field 44. Based on the thus received information, the title profile image is generated. The generated title profile image is displayed by the touch screen 16a.

The radar image generating section 70d generates the radar image of FIG. 7. To generate the radar image, the radar image generating section 70d first transmits to the user position management server 12 a set of coordinates stored in the position coordinate storage section 62 that is specified by the user and a size specification that specifies a 1×1 area as the search area, and thereby requests a search for nearby users. The radar image generating section 70d then receives user IDs and sets of position coordinates that are sent from the nearby user distributing section 94 of the user position management server 12 in response to the request. If the number of the received user IDs is less than ten, the radar image generating section 70d transmits to the user position management server 12 the same position coordinate set along with a size specification that specifies 2×2 areas as the search area, to thereby request a search for nearby users again. The radar image generating section 70d repeatedly requests the user position management server 12 to execute a search for nearby users until the number of user IDs and position coordinate sets received reaches ten or higher, or until the size of the search area reaches M×M (M is a given number) areas. The radar image is generated based on user IDs and position coordinate sets received from the nearby user distributing section 94 in this manner. Specifically, the radar image generating section 70d reads out, from the user terminal 16, its own avatar image 50 stored in advance, and places the avatar image 50 at the center of the touch screen 16a. The radar image generating section 70d calculates the difference between the position coordinate set specified by the user and each position coordinate set received from the nearby user distributing section 94 to determine the display positions of the avatar images 52 representing other users. In other words, the radar image generating section 70d displays the avatar images 52 at positions that are based on the positions of other user terminals 16 relative to the position of its own user terminal 16. The radar image generating section 70d also calculates the sum of gross player counts (the sum of gross player counts of all game titles) which are received from the ranking distributing section 92 when the travel route image is generated, and places a number of small images 54 that is determined by the calculated sum in the radar image at random. The radar image generated in this manner, too, is displayed by the touch screen 16a.

The item communication section 72 exchanges data such as an item used in a game program. The application executing section 66 generates an item when a game program is executed, and stores identification information of this item (an item ID) in the game performance storage section 68. Once an item ID is stored in the game performance storage section 68 in this manner, the item communication section 72 transmits the item ID to the user position management server 12 along with a relevant position coordinate set stored in the position coordinate storage section 62. The user position management server 12 stores the item ID and a relevant user ID in association with the area IDs of areas that contain the position coordinate set. The uploading of an item ID is completed in this manner.

The item communication section 72 also performs processing of receiving an item ID that has been uploaded from another user. In this case, the item communication section 72 transmits one of position coordinate sets stored in the position coordinate storage section 62 to the user position management server 12. The user position management server 12 returns an item ID and a user ID that are stored in association with the area ID of an area containing the received position coordinate set. The item communication section 72 may store every item ID received in this manner in the game performance storage section 68 to provide items identified by the stored item IDs for use in game programs. Alternatively, the item communication section 72 may calculate the degree of compatibility between its own user ID and a user ID received along with an item ID to store the item ID in the game performance storage section 68 only when the calculated degree of compatibility is equal to or larger than a given value and to provide an item identified by the stored item ID for use in a game program.

According to the communication system described above, a user can be aware of the presence of other users living in the same area without using short-distance wireless communication. In addition, the trail of positions calculated by the positioning unit 16b can be displayed in a manner easy for the user to comprehend without a map displayed on the touch screen 16a.

The present invention is not limited to the embodiment described above, and various modifications can be made to the invention. For instance, in the description given above, the area-based user ID storage section 84 accumulates the user IDs of users who have obtained position coordinates inside areas identified by their respective area IDs through positioning within a given period of time (for example, one week) and uploaded the position coordinates to the user position management server 12. When the user terminal 16 transmits position coordinates to the user position management server 12, the nearby user distributing section 94 identifies the area ID of an area that contains the received position coordinates and returns a user ID and a position coordinate set that are stored in the area-based user ID storage section 84 in association with the identified area ID. The user terminal 16 uses the returned information to generate the radar image and display a message in the travel route image. In short, in the example described above, information about the user terminals 16 that have calculated positions in the same area by positioning within a given period of time (for example, one week) is provided from the user position management server 12.

In a modification example, on the other hand, the nearby user distributing section 94 returns a calculating date/time in addition to a user ID and a position coordinate set that are stored in association with the identified area ID. In other words, the nearby user distributing section 94 returns a user ID, a position coordination set, and a calculating date/time in combination. The user terminal 16 reads a calculating date/time of each position coordinate set out of the position coordinate storage section 62 to select a calculating date/time returned from the nearby user distributing section 94 that differs from one of the read calculating dates/times by a given length of time or less, and displays information related to a returned combination that includes this calculating date/time. For instance, the user terminal 16 receives from the information server 14 information (e.g., latest information 34) about a user who is identified by the user ID included in the selected combination to display the information, and displays the avatar image 52 that represents this user ID in the radar image. Alternatively, if the user ID included in the selected combination is a friend user ID stored in advance, the user terminal 16 may display a message 28. This enables the user terminal 16 to display on the touch screen 16a information about other user terminals 16 that have performed positioning inside the same area within a given length of time from the time of its own positioning. The user terminal 16 may also calculate the difference between a stored calculating date/time and a returned calculating date/time and the difference between a stored position coordinate set and a returned position coordinate set to select a returned combination whose calculating date/time differs from a stored calculating date/time by a given length of time or less and whose position coordinate set differs from a stored position coordinate set by a given distance or less, and to display information about the selected combination. This way, the user terminal 16 can display on the touch screen 16a information about other user terminals 16 that are deduced to have been close in time and space both.

In another modification example, when the user terminal 16 transmits a set of position coordinates to the user position management server 12, the nearby user distributing section 94 identifies the area ID of an area that contains the received position coordinates and reads a combination of a user ID and a position coordinate set that is stored in the area-based user ID storage section 84 in association with the identified area ID. The nearby user distributing section 94 selects a read combination whose position coordinate set differs from the position coordinate set transmitted from the user terminal 16 by a given distance or less. The nearby user distributing section 94 returns the selected combination to the user terminal 16. Based on the returned information, the user terminal 16 generates the radar image and displays a message on the travel route image. This way, the user terminal 16 can display on the touch screen 16a only information about other user terminals 16 that have performed positioning within a given distance from itself.

In still another modification example, the user terminal 16 transmits a set of position coordinates and its calculating date/time to the user position management server 12. The nearby user distributing section 94 identifies the area ID of an area that contains the received position coordinates, and reads a combination of a user ID, a position coordinate set, and a calculating date/time that is stored in the area-based user ID storage section 84 in association with the identified area ID. The nearby user distributing section 94 selects a read combination whose calculating date/time differs from the calculating date/time transmitted from the user terminal 16 by a given length of time or less, and returns the selected combination to the user terminal 16. Alternatively, the nearby user distributing section 94 selects a combination whose calculating date/time differs from the received calculating time by a given length of time or less and whose position coordinate set differs from the received position coordinate set by a given distance or less, and returns the selected combination to the user terminal 16. Based on the returned information, the user terminal 16 generates the radar image and displays a message on the travel route image. This way, the user terminal 16 can display on the touch screen 16a information about other user terminals 16 that are deduced to have been close in time and space both.

In yet still another modification example, the area-based user ID storage section 84 stores, for each combination of an area ID and its associated time slot, a user ID, a position coordinate set, and a calculating date/time that are associated with the user terminal 16 that has calculated, by positioning, a position inside an area identified by the area ID at a date/time within the time slot. The user terminal 16 transmits a set of position coordinates and its calculating date/time to the user position management server 12. The nearby user distributing section 94 identifies the area ID of an area that contains the received position coordinates, and identifies a time slot that contains the received calculating date/time. The nearby user distributing section 94 returns a combination of a user ID, a position coordinate set, and a calculating date/time that is stored in the area-based user ID storage section 84 in association with the identified area ID and the identified time slot. Based on the returned information, the user terminal 16 generates the radar image and displays a message on the travel route image. This way, the user terminal 16 can display on the touch screen 16a information about other user terminals 16 that are deduced to have been close in time and space both.

The invention claimed is:

1. A communication system, comprising:
a position obtaining unit that obtains, from each of a plurality of user terminals, a position,
a user terminal selecting unit that selects, under a condition that the user terminal selecting unit obtains a position of a specified user terminal, one or more of the plurality of user terminals corresponding to the position obtained from the specified user terminal and the positions obtained from the plurality of user terminals, and
a display unit of the specified user terminal that displays indicia related to the selected one or more of the plurality of user terminals, such indicia including an indication as to a privacy setting of each of the selected one or more of the plurality of user terminals; wherein
as to each of the selected one or more of the plurality of user terminals, when the privacy setting indicates a desire for privacy, the indicia indicates a presence of the respective selected user terminal, but does not indicate the position of the respective selected user terminal; and wherein
the number of indicia indicating a presence but not a position is determined by a calculated sum including both a number of user terminals having a privacy setting indicating a desire for privacy and a number of user terminals having a privacy setting not indicating a desire for privacy.

2. The communication system according to claim 1, further comprising:
a storing unit that stores, under a condition that the position obtaining unit obtains a position, identification information of the user terminal from which the position is obtained in association with an area corresponding to the position, into a storage unit,
wherein the user terminal selecting unit obtains, under a condition that the user terminal selecting unit obtains a position of the specified user terminal, the identification information of the user terminal in association with the area corresponding to the position, the identification information being stored in the storage unit.

3. The communication system according to claim 2, wherein, under a condition that the identification information has been stored in the storage unit for more than a predetermined period of time, the storage unit deletes the identification information of the user terminal.

4. The communication system according to claim 2, wherein the user terminal selecting unit includes a unit that obtains identification information of the user terminal, the identification information being stored in the storage unit, in association with an area adjacent to the area corresponding to the position obtained from the specified user terminal.

5. The communication system according to claim 1, further comprising a position display unit that displays a position obtained from the selected one or more of the plurality of user terminals.

6. The communication system according to claim 1 comprising the plurality of user terminals,
wherein each of the plurality of user terminals comprises:
a calculating unit that repeatedly calculates a position of itself, and stores the calculated position repeatedly into a position storage unit; and
a transmitting unit that transmits a plurality of calculated positions stored in the position storage unit to a server.

7. The communication system according to claim 1, wherein the information providing unit provides the specified user terminal with data for an application program obtained from the selected user terminal.

8. A communication method, comprising:
    obtaining, from each of a plurality of user terminals, a position;
    selecting, under a condition that a position of a specified user terminal is obtained, one or more of the plurality of user terminals corresponding to the position obtained from the specified user terminal and the positions obtained from the plurality of user terminals; and
    displaying in association with the specified user terminal indicia related to the selected one or more of the plurality of user terminals, such indicia including an indication as to a privacy setting of each of the selected one or more of the plurality of user terminals; wherein
    as to each of the selected one or more of the plurality of user terminals, when the privacy setting indicates a desire for privacy, the indicia indicates a presence of the respective selected user terminal, but does not indicate the position of the respective selected user terminal; and wherein
    the number of indicia indicating a presence but not a position is determined by a calculated sum including both a number of user terminals having a privacy setting indicating a desire for privacy and a number of user terminals having a privacy setting not indicating a desire for privacy.

9. A program product comprising a non-transitory storage medium with a set of instructions stored therein that, when executed by a processor cause the steps of:
    obtaining, from each of a plurality of user terminals, a position;
    selecting, under a condition that a position of a specified user terminal is obtained, one or more of the plurality of user terminals corresponding to the position obtained from the specified user terminal and the positions obtained from the plurality of user terminals; and
    displaying in association with the specified user terminal indicia related to the selected one or more of the plurality of user terminals, such indicia including an indication as to a privacy setting of each of the selected one or more of the plurality of user terminals; wherein
    as to each of the selected one or more of the plurality of user terminals, when the privacy setting indicates a desire for privacy, the indicia indicates a presence of the respective selected user terminal, but does not indicate the position of the respective selected user terminal; and wherein
    the number of indicia indicating a presence but not a position is determined by a calculated sum including both a number of user terminals having a privacy setting indicating a desire for privacy and a number of user terminals having a privacy setting not indicating a desire for privacy.

10. A non-transitory information storage medium for storing a program for causing a computer to execute:
    obtaining, from each of a plurality of user terminals, a position;
    selecting, under a condition that a position of a specified user terminal is obtained, one or more of the plurality of user terminals corresponding to the position obtained from the specified user terminal and the positions obtained from the plurality of user terminals; and
    displaying in association with the specified user terminal indicia related to the selected one or more of the plurality of user terminals, such indicia including an indication as to a privacy setting of each of the selected one or more of the plurality of user terminals; wherein
    as to each of the selected one or more of the plurality of user terminals, when the privacy setting indicates a desire for privacy, the indicia indicates a presence of the respective selected user terminal, but does not indicate the position of the respective selected user terminal; and wherein
    the number of indicia indicating a presence but not a position is determined by a calculated sum including both a number of user terminals having a privacy setting indicating a desire for privacy and a number of user terminals having a privacy setting not indicating a desire for privacy.

* * * * *